United States Patent
Fonkalsrud et al.

(10) Patent No.: US 6,560,549 B2
(45) Date of Patent: May 6, 2003

(54) METHOD FOR DETERMINING THE TRANSMISSION OUTPUT TORQUE FOR AN EARTH MOVING MACHINE

(75) Inventors: Andrew O. Fonkalsrud, Yorkville, IL (US); Bradford A. Kough, Metamora, IL (US); Eric A. Reiners, Saint Charles, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 08/996,286

(22) Filed: Dec. 22, 1997

(65) Prior Publication Data

US 2002/0147552 A1 Oct. 10, 2002

(51) Int. Cl.$^7$ .............................................. G06F 19/00
(52) U.S. Cl. .................. 702/41; 702/33; 73/862.08; 73/862.191; 73/862.23; 73/862.27
(58) Field of Search ................ 702/41–44, 33, 702/96, 101, 102, 105, 115, 126, 141, 142, 145–148, 175, 182–185, FOR 123–FOR 126, FOR 135, FOR 136, FOR 150–FOR 152, FOR 170, FOR 175, 173, 174; 477/120, 107, 109, 115, 118, 111, 30, 904, 36, 68, 69, 900, 110, 15, 34, 35, 37, 46, 49, 124; 74/335, 336 R, 337; 475/280, 281, 47, 43, 46, 94, 125, 126, 904; 701/51, 50, 29, 67, 68, 84, 87, 90, 54, 53, 93; 73/118.1, 118.2, 862.31, 321, 862.324, 862.325, 862.193, 1.09, 1.11, 1.12, 116, 117.3, 119 R, 862.08, 862.24, 862.27–862.29, 862.194, 862.195; 192/3.23, 3.26, 3.58, 3.3, 3.33; 172/4, 5, 7, 8; 180/53.4, 249; 177/25.11–25.13, 136–141, 147

(56) References Cited

U.S. PATENT DOCUMENTS 4,765,434 A 8/1988 Kawamoto et al. ......... 180/249
5,014,809 A * 5/1991 Matsuda ........................ 701/87
5,070,961 A * 12/1991 Tezuka .......................... 701/87
5,184,527 A 2/1993 Nakamura .................... 477/110
5,448,478 A * 9/1995 Eto ................................ 701/87
5,509,520 A 4/1996 Evans et al. ................ 192/3.23
5,535,830 A 7/1996 Matsushita et al. ............ 172/7
5,594,643 A 1/1997 Birchenough et al. ........ 701/51
5,608,626 A * 3/1997 Ibamoto et al. ............ 192/3.58
5,613,581 A 3/1997 Fonkalsrud et al. ....... 192/3.23
5,720,358 A 2/1998 Christensen et al. ....... 180/53.4
5,754,967 A * 5/1998 Inoue et al. .................. 701/87
5,848,371 A 12/1998 Creger ........................ 701/101
5,910,176 A 6/1999 Creger ........................ 701/59
5,950,141 A * 9/1999 Yamamoto et al. ........... 702/41
5,957,991 A * 9/1999 Yasuda ......................... 701/84
5,999,873 A * 12/1999 Minowa et al. ............... 701/51

FOREIGN PATENT DOCUMENTS

EP 0512726 A2 4/1992 .......... B60K/41/06
EP 0754888 A2 1/1997 .......... F16H/61/04

* cited by examiner

Primary Examiner—Hal Wachsman
(74) Attorney, Agent, or Firm—W Bryan McPherson (57) ABSTRACT

The present invention is adapted to provide a method for determining the torque of a driveshaft. In the preferred embodiment a drivetrain includes a front and a rear drivetrain. The drivetrain is also connected to an engine, torque converter, front and rear axle and a transmission. In one embodiment, the ability to determine the transmission output torque for an earth moving machine includes determining an output torque of the converter and a gear reduction of the engine, and then responsively determining the front and rear driveshaft torque in response to the converter output torque and the engine gear reduction. The driveshaft torque calculations may be performed while the earth moving machine is operating. The resulting front and rear driveshaft torque calculations may be used to determine an axle damage index, or axle life calculations.

12 Claims, 5 Drawing Sheets

METHOD FOR DETERMINING THE TRANSMISSION OUTPUT TORQUE FOR AN EARTH MOVING MACHINE

TECHNICAL FIELD

The present invention relates generally to a drive train of an earth moving machine, and more particularly, to a method for determining the torque of a drive shaft of an earth moving machine.

BACKGROUND ART

Earth moving machines such as front wheel loaders are used generally for digging operations and for transferring bulk material from a stock pile onto transport vehicles such as trucks or railroad cars. In such machine loading applications, the front and rear axle may experience excessive torque which will effect the life of the axle. If accurate front and rear driveshaft torques can be calculated, then the possibility exists to determine a cumulative axle life. The ability to determine a cumulative axle life would enable prognostic information to be provided to the operator of the machine regarding how much life was left on the loader axles. Knowing the remaining life would enable the operator to schedule an axle overhaul or replacement and thus greatly reduce downtime due to axle failure. In addition, the ability to determine transmission output torque and axle life will enable a mine manager to evaluate the effects of different blast techniques, material types, and operators on axle and drivetrain life.

The present invention is directed to overcome one or more of the problems set forth above.

DISCLOSURE OF THE INVENTION

In one aspect of the present invention, a method for determining a torque of a driveshaft is disclosed. The driveshaft is connected to a drivetrain having an engine, a torque converter, a front and rear axle, and a transmission. The method includes the steps of determining an output torque of the converter, and a gear reduction of the transmission. The total driveshaft torque is then determined in response to the converter output torque and the transmission gear reduction.

BEST MODE FOR CARRYING OUT THE INVENTION

Figure 1:
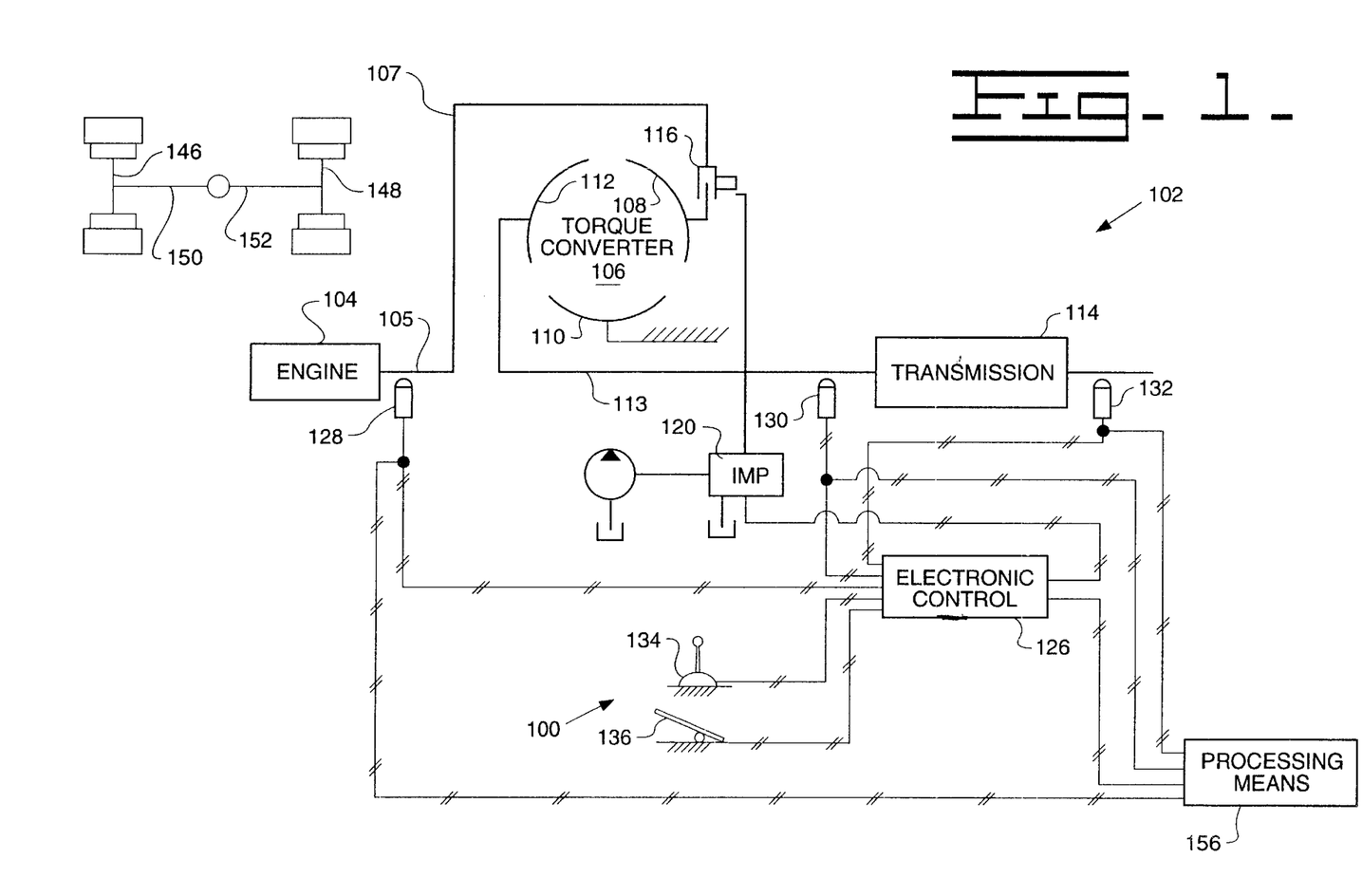
FIG. 1 shows a block diagram of an electrohydraulic drive system for a machine.

With reference to FIG. 1, the present invention is adapted to determine the transmission output torque of a drivetrain 102 The drivetrain 102 includes an engine 104 having a shaft 105 connected to a torque converter 106. The torque converter 106 includes a rotating housing 107, an impeller element 108, a reactor element 110, and a turbine element 112 connected to a centrally located output shaft 113. The output shaft 113 provides the input to a multispeed transmission 114. The drivetrain 102 also includes an impeller clutch 116 located between the engine, 104 and the torque converter 106. An electrohydraulic impeller clutch valve 120 provides fluid flow to actuate the impeller clutch. There is an operator control handle 134 for selectively controlling the operation of the transmission. The control handle generates transmission control signals to the control module indicative of a desired gear ratio and/or direction of the machine. An operator impeller pedal 136 is provided for selectively controlling the degree of engagement of the impeller clutch. The impeller pedal is rockable about a transversely oriented pivot pin. As the pedal is depressed from an elevated position to an intermediate position the ability of the impeller clutch 116 to transmit torque to the impeller element 108 from the engine is proportionally reduced. When depressed, the impeller pedal generates an impeller control signal to the electronic control module 126 proportional to the pedal position.

The drivetrain 102 is located on an earthmoving machine having a front and rear axle 146, 148. In the preferred embodiment, the drive train includes a front and a rear drive shaft 150, 152.

An engine speed sensing means 128 senses the rotational output speed of the engine 104 and responsively produces an engine speed signal. In the preferred embodiment, the engine speed sensing means 128 includes a speed sensor.

A torque converter speed sensing means 130 senses the rotational output speed of the torque converter 106 and responsively produces a torque converter output speed signal. In the preferred embodiment, the torque converter speed sensing means 130 includes a speed sensor.

In some vehicles, the torque converter and the transmission are coupled through an additional gear box (not shown). In such vehicles, the transmission input speed is not equal to the torque converter output speed. For such systems, separate sensing means would sense the rotational output speed of the torque converter 106 and the rotational input speed of the transmission 116.

However for the remaining discussion, it is assumed that the torque converter 106 and transmission 114 are directly coupled by the drive shaft 113. In such machines, therefore, the torque converter output speed and the transmission input speed are equal and are therefore interchangeable.

A transmission speed sensing means 132 senses the rotational output speed of the transmission 114 and responsively produces a transmission output speed signal. In the preferred embodiment, the transmission speed sensing means 132 includes a transmission speed sensor.

The engine speed sensing means, torque converter speed sensing means and transmission speed sensing means, may include magnetic speed pickup sensors, Hall effect sensors, tachometers, or other suitable measuring means.

In one embodiment of the present invention, a processing means 132 receives the engine speed, torque converter output speed, transmission output speed, and impeller clutch pressure signals and responsively determines the output torque of the transmission 114. In the preferred embodiment, a front and rear driveshaft torque are determined in response to the transmission output torque. The processing means 132 preferably includes RAM and ROM modules that store software programs to carry out certain features of the present invention. The processing means 132 also includes at least one microprocessor for executing the software programs.

Figure 2:
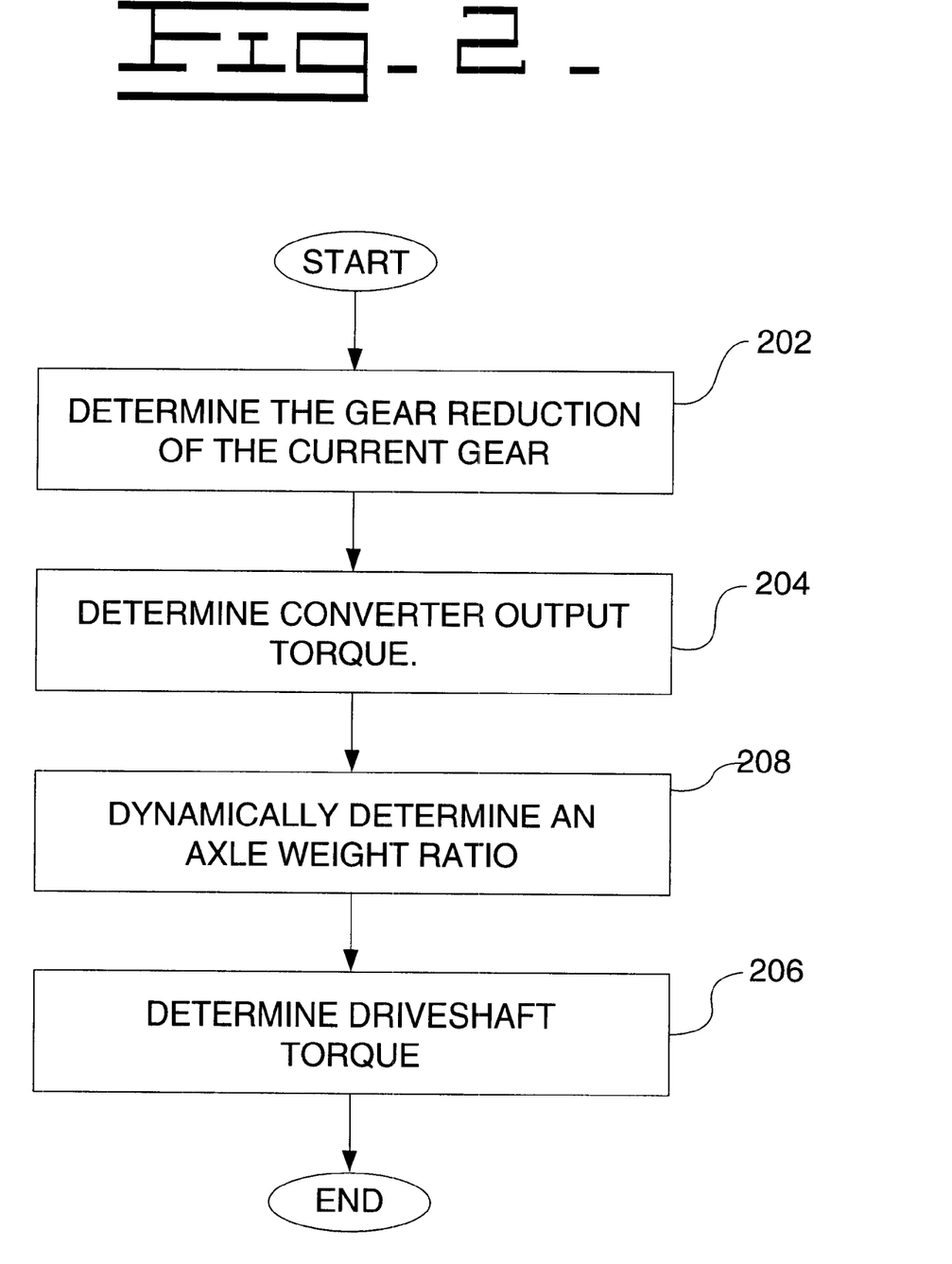
FIG. 2 shows a flowchart illustrating the method of the present invention.

With reference to FIG. 2, a flow diagram illustrating one embodiment of a method for determining the transmission output torque, is shown. The determination of the transmission output torque is based upon the output torque of the converter 106 and the gear reduction of the current transmission gear. In general the transmission output torque may be determined by the following equation:

> Transmission Output Torque=Converter Output Torque*Gear Reduction

Therefore, in a first control block 202, the gear reduction of the current gear is determined. In the preferred embodiment a method or apparatus for determining the current gear of the transmission is used. For example, a gear sensing means may be incorporated to sense the current gear of the transmission 114. In an alternative embodiment the torque speed ratio may be used to derive the current gear of the transmission 114.

In the event a method or apparatus is not used to precisely determine the current gear of the transmission, the transmission 114 may be assumed to be in first gear. The rationale for this assumption is that one of the uses for this invention is to determine the life of the front and rear axle 146, 148. Axle life calculations are based, in part, on the transmission output torque. The transmission driveshaft of a machine experiences the most torque during the digging portion of operation. An earth moving machine operates in first gear during the digging operations. Therefore, assuming the transmission 114 is in first gear addresses the most stressing conditions experienced by the transmission driveshaft.

Even though the transmission 114 may be assumed to be in a first gear, the direction of travel must be sensed in order to determine whether the transmission is in a first forward gear, or a first reverse gear. In the preferred embodiment, the direction of travel is determined by monitoring the transmission output speed signal generated by the transmission output speed sensor 130. A positive transmission output speed indicates a forward direction of travel, and a negative value indicates a reverse direction of travel.

Once the current gear of the transmission 114 is determined a lookup table containing gear reduction values corresponding to the transmission gears is used to determine the gear reduction value.

Figure 3:
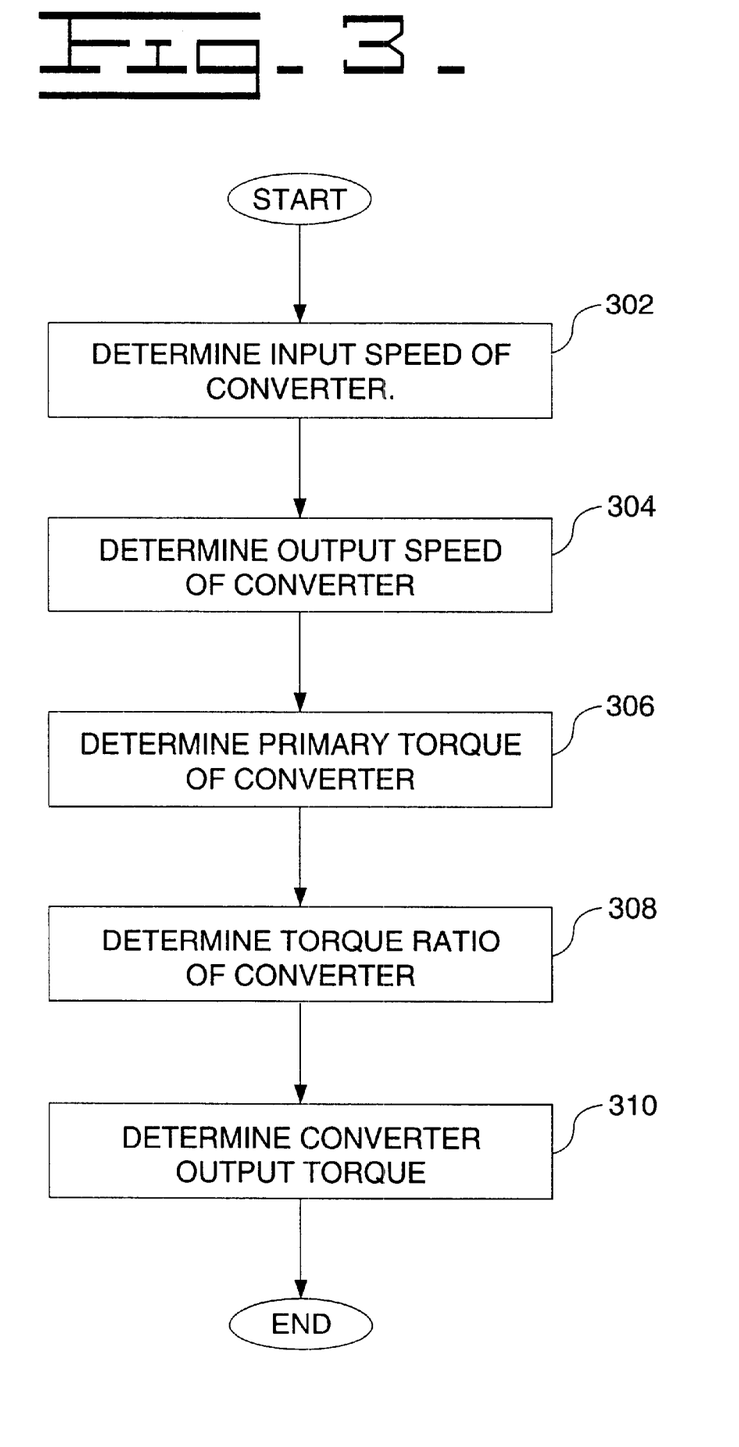
FIG. 3 shows a flowchart illustrating the method of determining the torque ratio of a converter.

In a second control block 204, the converter output torque is determined. The converter output torque is dependent on the primary torque, torque ratio, and the input and output speed of the torque converter 113. The converter output torque may be determined by the following equations:

> Converter Output Torque=Primary Torque*Torque Ratio*(Input Speed/Output Speed)$^2$
>
> Converter Input Speed=Impeller Speed
>
> Impeller Speed=Engine Speed With reference to FIG. 3, a flow diagram illustrating one embodiment of a method for determining the converter output torque, is shown. In a first control block 302 the input speed of the converter 106 is determined. The converter input speed is equal to the impeller speed. The impeller speed is equal to the engine speed when the impeller clutch 116 is not slipping. Therefore, when the impeller clutch 116 is not slipping, the input speed of the converter 106 is equal to the engine speed.

Figure 4:
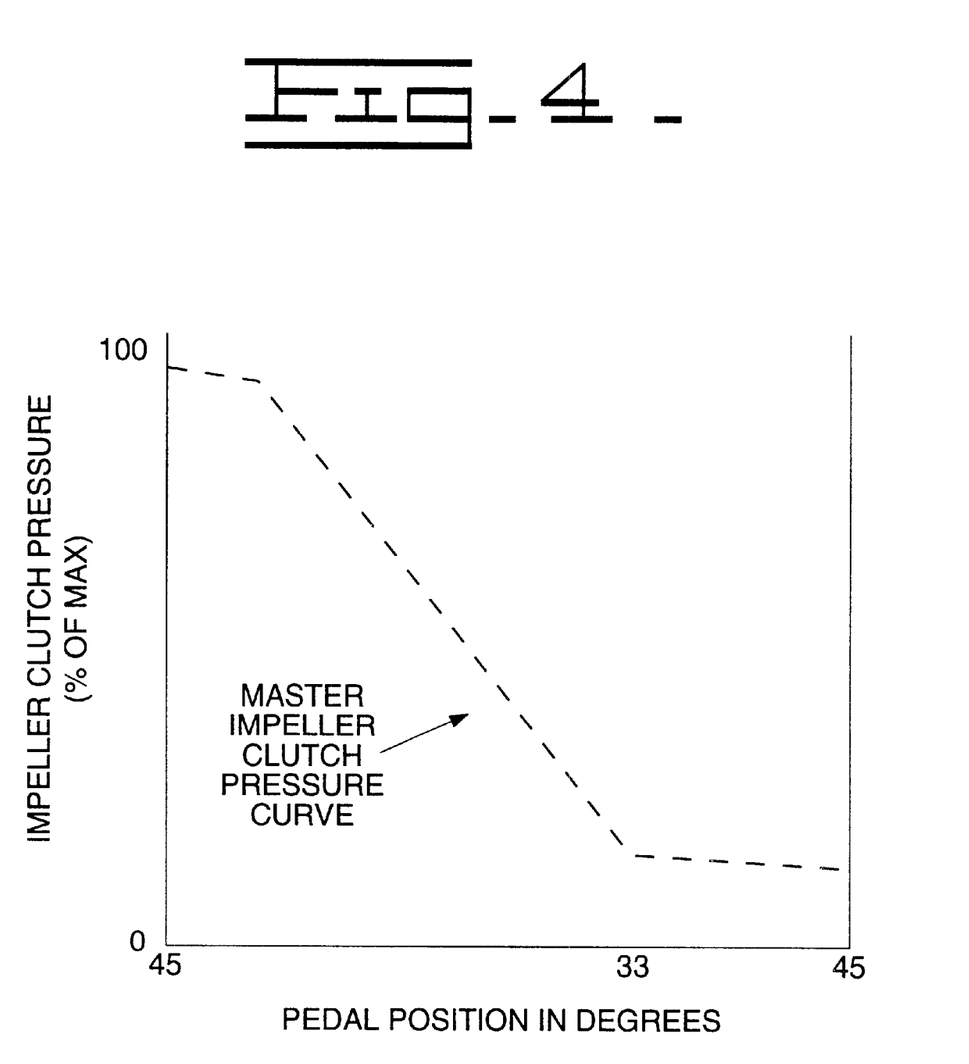
FIG. 4 illustrates an impeller clutch pressure as a function of an impeller clutch pedal depression.

When the impeller clutch pressure is low, the clutch 154 slips and the converter output torque calculation is not valid. Therefore, the clutch pressure is monitored. The clutch pressure may be determined as a function of the impeller clutch pedal depression. For example, reference is now made to the graph shown in FIG. 4, which illustrates the impeller clutch pressure as a function of the impeller clutch pedal depression. As the pedal is depressed from a fully elevated 45° first position to an intermediate 33° second position, the electronic control module adjusts the impeller clutch pressure proportionally. Therefore, in one embodiment, the electronic control module determines and generates an impeller clutch pressure signal. The processing means 156 receives and analyzes the impeller clutch pressure signal. When the impeller clutch pressure is determined to be low a predetermined lookup table is utilized to determine the converter output torque. The lookup table includes values of the converter output torque as a function of the impeller clutch pressure. The number of values stored in the look-up table is dependent upon the desired precision of the system. Numerical interpolation may be used to determine the converter output torque in the event the measured impeller clutch pressure falls between the discrete values used to form the look-up table. The table values are derived from simulation and analysis of empirical data indicative of the machine. In an alternative embodiment a lookup table including values of the converter output torque as a function of the impeller clutch pressure is continuously used, instead of only when the pressure is low.

In a second control block 304 the output speed of the converter 106 is determined by analyzing the torque converter output speed signal. Control is then passed to a third control block 306 to determine the primary torque of the torque converter 106.

In the preferred embodiment the primary torque is determined in response to the torque converter speed ratio. The torque converter speed ratio is determined by the following equation:

> Converter Speed Ratio=Converter Output Speed/Converter Input Speed

Again, the converter input speed is equal to the engine speed when the impeller clutch 116 is not slipping. When the impeller clutch 116 is slipping, a look-up table containing values of the converter input speed as a function of the impeller pressure is used.

The primary torque is determined using a look-up table. The look-up table (not shown) contains stored values of the primary torque as a function of the torque converter speed ratio. The number of values stored in the look-up table is dependent upon the desired precision of the system. The method selects a value for the primary torque from the look-up table corresponding to the current converter speed ratio. Numerical interpolation may be used to determine the actual primary torque value in the event the measured converter speed ratio falls between the discrete values used to form the look-up table. The table values are derived from simulation and analysis of empirical data indicative of the machine. Although a look-up table is described, it is well known in the art that an empirical equation (or sets of) may readily be substituted for the look-up table if greater accuracy is desired. Once the primary torque is determined by using the look-up table, control then passes to a fourth control block 308.

In the fourth control block 308 the torque ratio of the converter is determined. The torque ratio is dependent upon the converter speed ratio, and is determined using a lookup table. The look-up table contains stored values of the torque ratio corresponding to values of the converter speed ratio. In the preferred embodiment there is one look up table that contains values of both the primary torque and the torque ratio corresponding to predetermined values of the converter speed ratio.

Control then passes to a fifth control block 310, and the converter output torque is determined by the following equation:

Converter Output Torque=Primary Torque*Torque Ratio*(Input Speed/Output Speed)$^2$ Once the converter output torque and the gear reduction are determined, the transmission output torque may be determined.

If a method or apparatus is used to determine the current gear of the transmission 114, the transmission output torque may be determined by the following equation:

Transmission Output Torque=Converter Output Torque*Gear Reduction

In an alternative embodiment, if the transmission is assumed to be in first gear, then:

If the direction of travel=Forward Direction:Transmission Output Torque=Converter Output Torque*1$^{st}$ Forward Gear Reduction If the direction of travel=Reverse Direction:Transmission Output Torque=Converter Output Torque*1$^{st}$ Reverse Gear Reduction The result is the determination of the transmission output torque which may be dynamically calculated throughout the operation of the earth moving machine.

In the preferred embodiment the drivetrain of an earth moving machine includes a front and rear driveshaft 150, 152. The torque of the front and rear driveshaft 150, 152 may be calculated. The transmission output torque is distributed between the front and rear driveshaft 150, 152 in the following manner:

Transmission Output Torque=Front Driveshaft Torque+Rear Driveshaft Torque

In addition, the ratio of rear to front axle weights is equal to the ratio of rear to front driveshaft torque, as shown below.

Rear Axle Weight/Front Axle Weight=Rear Driveshaft Torque/Front Driveshaft Torque Solving these two equations for the front driveshaft torque leads to the following equation:

Front Driveshaft Torque=Transmission Output Torque/(Rear Axle Weight/Front Axle Weight+1)

Control may pass to control block 206 to determine an axle weight ratio. In the preferred embodiment, the ratio of the rear axle weight to front axle weight is determined by first determining the rear and front axle weights. A detailed discussion involving one embodiment of axle weight calculations is provided below.

Once the front and rear axle weights are determined, control may pass to control block 208 to determine the driveshaft torque, for example, the front and rear driveshaft torques may determined. The front and rear driveshaft torques may be dynamically determined throughout the operation of the earth moving machine.

The method for dynamically determining the output torque of a transmission 114 and the associated look-up tables, are embodied in a microprocessor based system which utilizes arithmetic units to control process according to software programs. Typically, the programs and associated look-up tables are stored in read-only memory, random-access memory or the like.

Figure 5:
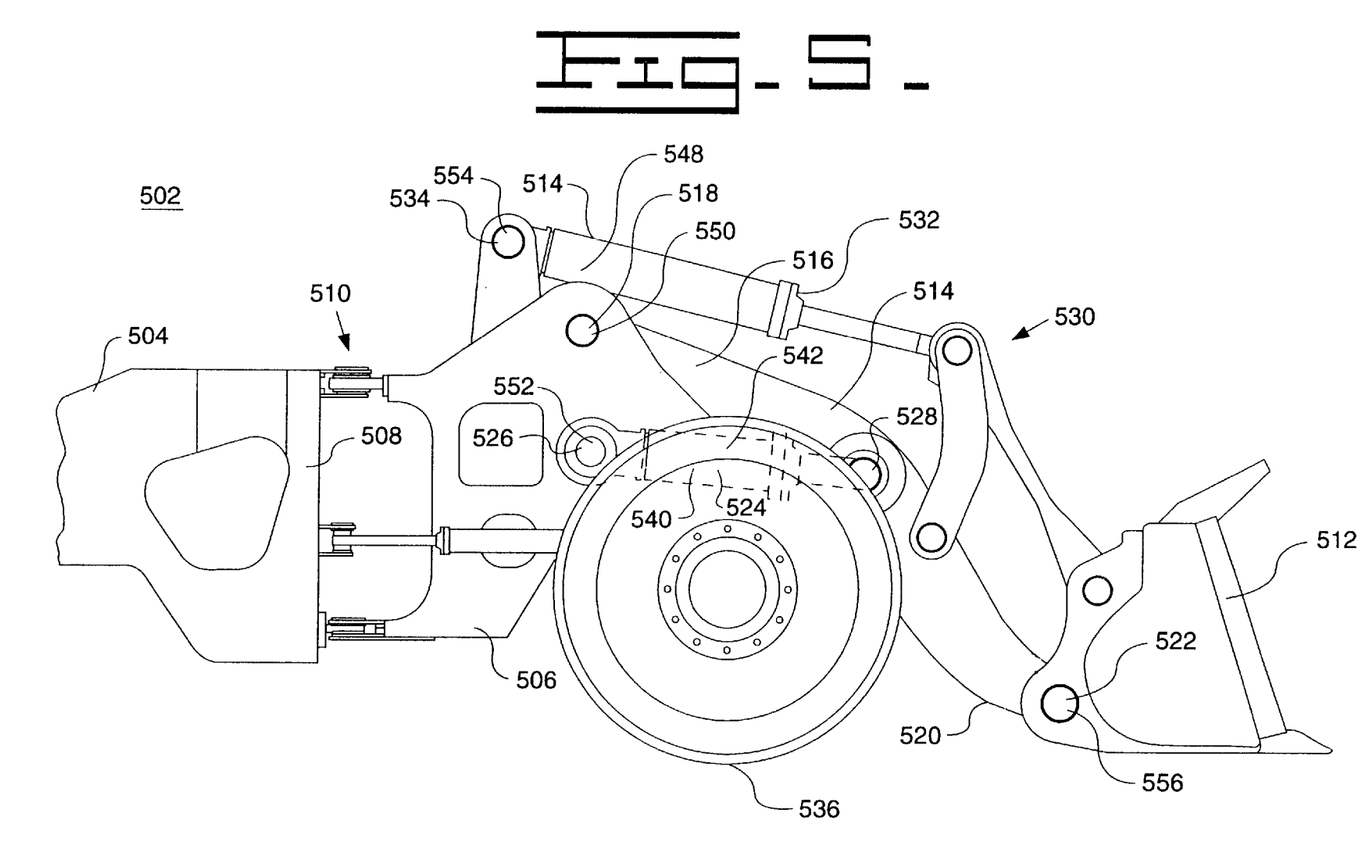
FIG. 5 illustrates a portion of front end wheel loader.

In the one embodiment the following equations may be used to determine the rear to front axle weights of an earth moving machine, such as the front end wheel loader shown in FIG. 5:

$$\Sigma M_{FA} = W_{NEEF}(X_{FA}-X_{NEEF}) -$$

$$(Y_Y-W_Y)(X_{FA}-X_Y)-Y_X$$

$$(Y_Y-Y_{FA})+A_X(Y_A-Y_{FA})+$$

$$(A_Y+W_A)(X_{FA}-X_A)-$$

$$(G_Y-W_G)(X_{FA}-X_G)-G_X$$

$$(Y_G-Y_{FA})+W_{EEF}(X_{FA}-X_{EEF})-$$

$$R_A(X_{FA}-X_{RA})$$

So That $$R_A = \frac{W_{NEEF}(X_{FA}-X_{NEEF})-(Y_Y-W_Y)(X_{FA}-X_Y)-Y_X(Y_Y-Y_{FA})+A_X(Y_A-Y_{FA})+(A_Y+W_A)(X_{FA}-X_A)-(G_Y-W_G)(X_{FA}-X_G)-G_X(Y_G-Y_{FA})+W_{EEF}(X_{FA}-X_{EEF})}{(X_{FA}-X_{RA})}$$

$$\sum M_{RA} = F_A(X_{FA}-X_{RA}) - W_{NEEF}(X_{NEEF}-X_{RA}) -$$

$$W_{EEF}(X_{EEF}-X_{RA}) + (Y_Y-W_Y)(X_Y-X_{RA}) - Y_X(Y_Y-Y_{RA}) -$$

$$(A_Y+W_A)(X_A-X_{RA}) + A_X(Y_A-Y_{RA}) - G_X(Y_G-Y_{RA})(G_Y-W_G)(X_G-X_{RA})$$

So That $$F_A = \frac{W_{NEEF}(X_{NEEF}-X_{RA})+W_{EEF}(X_{EEF}-X_{RA})-(Y_Y-W_Y)(X_Y-X_{RA})+Y_X(Y_Y-Y_{RA})+(A_Y+W_A)(X_A-X_{RA})-A_X(Y_A-Y_{RA})+(G_X(Y_G-Y_{RA})-(G_Y-W_G)(X_G-X_{RA})}{(X_{FA}-X_{RA})}$$

Where $\Sigma M_{FA}$=The sum of the forces acting on the front axle $\Sigma M_{RA}$=The sum of the forces acting on the rear axle $F_A$=The reaction force at the front axle $A_{X,Y}$=The horizontal and vertical force at the A pin $G_{X,Y}$=The horizontal and vertical force at the G pin $W_{NEEF}$=The weight of the non-engine endframe $X_{(LOCATION)}$=The horizontal location of the designated point $Y_{(LOCATION)}$=The vertical location of the designated point
$R_A$=The reaction force at the rear axle
$Y_{X,Y}$=The horizontal and vertical force at the Y pin
$W_{A,G,Y}$=The weight of the A, G, and & Y pin
$W_{EEF}$=The weight of the engine endframe The elements in the above equation are illustrated in FIG. 5. A machine 502, such as a front end wheel loader, has a rear frame assembly 504 that mounts to a front frame assembly 506. The front frame assembly 506 is also referred to as the non-engine end frame assembly. The rear frame assembly is also referred to as the engine end frame assembly. The front frame assembly 506 is mounted to the rear frame assembly 504 through an articulation hitch that is generally at 510. A work implement 512 is mounted to the front frame assembly 506. The work implement 512 is mounted to the front frame assembly 506 by a lift arm assembly 514. The first end portion 116 of the lift arm assembly 514 is connected to the front frame assembly 106 by a frame pin assembly 518. The frame pin assembly 518 includes a lift arm pin 550, commonly referred to as the A pin. The second end portion 520 of the lift arm assembly 514 is connected to the work implement 512 by a bucket pin assembly 522. The bucket pin assembly 522 includes a bucket pin 556, commonly known as the B pin. The lift arm assembly 514 is moved along the vertical plane by at least one lift cylinder 524. If two lift cylinders 524 are used, they are positioned on opposite sides of the lift arm assembly 514. Each lift cylinder 524 has a first end portion pivotally mounted to the front frame assembly 506 by a lift arm pin assembly 526 and a second end portion mounted to the lift arm assembly 514 by a lift bucket pin assembly 528. The lift arm pin assembly 526 includes a lift cylinder pin 552, commonly referred to as the Y pin.

The work implement 512 is rotated about the bucket pin assembly 522 by a tilt link arrangement shown generally at 530. At least one tilt cylinder 532 is positioned between the front frame assembly 506 and the tilt link arrangement 530. A first end portion of the tilt cylinder 532 is pivotally mounted to the front frame assembly 506 by a tilt pin assembly 534. The tilt pin assembly 534 includes a tilt cylinder pin 554, commonly referred to as the G pin. The tilt cylinder 532 extends forwardly and has a second end portion that is mounted to the tilt link arrangement 530.

A lift cylinder displacement sensing means 540 is used to determine the amount of cylinder extension in the lift cylinder 524, and responsively generates a lift cylinder displacement signal. In the preferred embodiment the lift cylinder displacement sensing means includes a rotary sensor sensing the rotation of one of the lift arm pins 550 from which the extension of the lift cylinders 524 can be derived. A lift cylinder pressure sensing means 542, such as a pressure transducer, senses the hydraulic pressure in both ends of the lift cylinders 524 and responsively generates lift cylinder pressure signals. In addition a tilt cylinder displacement sensing means 544 is used to determine the amount of cylinder extension in the tilt cylinder 532, and responsively generates a tilt cylinder displacement signal. A tilt cylinder pressure sensing means 548, such as a pressure transducer, senses the hydraulic pressure in both ends of the tilt cylinders 532 and responsively generates a tilt cylinder pressure signals.

With reference to the above axle weight equations, the weight and location of the center of gravity of the front frame assembly 506 and the rear frame assembly 104 are predetermined. In addition, the weights of the lift cylinder pin 552, lift arm pin 150, and tilt cylinder pin 554 are predetermined.

The lift cylinder and tilt cylinder displacement signals are used to determine whether the lift arm pin 550, the bucket pin 556, and the load point are within +/−15 degrees of being colinear. The load point is defined as being a point four inches behind the cutting edge in the center of the bucket 512. The load point is the point on the bucket 512 where the load forces are translated to. The load point is an SAE defined point used to define the location of tipping force loads. The axle weight calculations of the present invention are not valid when the colinear condition exist. The aspect of determining whether a lift arm pin 550, bucket pin 556, and load point are within +/−15 degrees of being colinear are considered to be within the level of ordinary skill in the art and will not be set forth herein.

The determination of the lift cylinder, lift arm, and tilt cylinder pin forces involves translation of the corresponding forces acting through the tilt link arrangement 530, the lift arm assembly 114, and the work implement 512. The determinations include sensing the displacement of the lift and tilt cylinders, 524, 532. In addition, the forces acting on the bucket 512, e.g., load forces from digging or lifting, are determined and used to determine the lift cylinder, lift arm, and tilt cylinder pin forces. The load forces resulting from digging or lifting may be determined by analyzing the lift and tilt pressure signals. The precise computations of the lift cylinder, lift arm, and tilt cylinder pin forces, are dependent on the particular machine configuration, but are considered to be within the level of ordinary skill in the art and will not be set forth herein. The front and rear axle weights are determined in response to the weight of the front frame assembly 506, and the rear frame assembly 504, the weights of the lift cylinder pin 554, lift arm pin 550, and tilt cylinder pin 552, and the forces acting on the lift cylinder pin 554, lift arm pin 550, and tilt cylinder pin 552.

INDUSTRIAL APPLICABILITY

With reference to the drawings and in operation, the present invention is adapted to provide a method for determining the torque of a driveshaft. In the preferred embodiment a drivetrain includes a front and a rear drivetrain. The drivetrain is also connected to an engine, torque converter, front and rear axle and a transmission. The method includes determining an output torque of the converter and a gear reduction of the engine, and then responsively determining the front and rear driveshaft torque.

In the preferred embodiment, the driveshaft torque calculations are dynamically performed while the earth moving machine is operating. The resulting front and rear driveshaft torque calculations may be used to determine an axle damage index, or axle life calculations. Once the front and rear driveshaft torque are determined, the values are compared with a torque threshold value, or endurance limit. If the torque value is below the endurance limit then there is no significant damage that is occurring to the axle due to the torque. If the torque value exceeds the endurance limit then damage is occurring to the axle. Most of the damage to the axle by excessive torque will occur while the machine is performing a digging function, which is performed in first gear.

Axle life calculations based on the determination of the front and rear torque values may be used to provide prognostic information to an on board or off board operator of the machine regarding how much use is left on the machine axles. Knowing the remaining use of the axle, the operator may schedule an axle overhaul, thereby reducing unplanned downtime due to axle failure. In addition, an axle damage index number would enable an analysis of an operators digging technique.

Other aspects, objects, advantages and uses of the present invention can be obtained from a study of the drawings, disclosures and appended claims.

What is claimed is:

1. A method for determining a torque of a driveshaft located on an machine, the driveshaft being connected to a drivetrain having an engine, a torque converter, a front and rear axle, and a transmission, comprising the steps of:

determining a gear reduction of said transmission;

determining an output torque of said torque converter;

dynamically determining an axle weight ratio; and determining said driveshaft torque in response to said torque converter output torque, said axle weight ratio, and said transmission gear reduction.

2. The method, as set forth in claim 1, wherein the step of determining said driveshaft torque includes the steps of:

determining a direction of travel of the machine; and, responsively determining said driveshaft torque in response to said direction of travel, said torque converter output torque, and said transmission gear reduction.

3. The method, as set forth in claim 1, wherein the step of determining a converter output torque further includes the steps of:

determining a primary torque of said converter;

determining a torque ratio of said converter;

determining an input speed of said converter;

determining an output speed of said converter; and, determining said converter output torque in response to said primary torque, said torque ratio, said converter input speed, and said converter output speed.

4. The method as set forth in claim 3 wherein the step of determining said converter output torque includes the steps of:

determining a speed ratio of said converter;

determining said primary torque in response to said converter speed ratio; and determining said torque ratio in response to said converter speed ratio.

5. The method as set forth in claim 4, wherein the step of determining said driveshaft torque includes the steps of:

determining a front driveshaft torque; and, determining a rear driveshaft torque.

6. The method, as set forth in claim 5, including the steps of:

determining said front and said rear driveshaft torque in response to said driveshaft torque, and said axle weight ratio.

7. The method, as set forth in claim 6, wherein the machine has a front axle and a rear axle, and further wherein the step of dynamically determining said axle weight ratio includes the steps of:

determining a weight of said front axle;

determining a weight of said rear axle; and determining said axle weight ratio in response to said front and rear axle weight.

8. The method, as set forth in claim 7, wherein the step of dynamically determining said axle weight ratio further includes the steps of:

dynamically determining at least one force acting on said front axle;

dynamically determining at least one force acting on said rear axle; and dynamically determining said axle weight ratio in response to said front and said rear axle weight, and said front and said rear at least one axle force.

9. The method, as set forth in claim 8, wherein the step of dynamically determining said at least one front axle force includes the step of determining a sum of forces acting on said front axle.

10. The method, as set forth in claim 9, wherein the step of dynamically determining said at least one rear axle force includes the step of determining a sum of forces acting on said rear axle.

11. The method, as set forth in claim 10, wherein the machine includes a bucket, and a lift cylinder attached to the bucket, and a tilt cylinder attached to the bucket, wherein the step of determining a sum of forces acting on said front axle further includes the steps of:

determining at least one of a lift cylinder displacement and a lift cylinder pressure of said lift cylinder; and determining said sum of forces acting on said front axle in response to said one of said lift cylinder displacement and said lift cylinder pressure of said lift cylinder.

12. The method, as set forth in claim 11, wherein the step of determining a sum of forces acting on said front axle further includes the steps of:

determining at least one of a tilt cylinder displacement, and a tilt cylinder pressure of said tilt cylinder; and determining said sum of forces acting on said front axle in response to said at least one of said tilt cylinder displacement and said tilt cylinder pressure.

* * * * *